United States Patent

Gelblum et al.

[11] Patent Number: 5,757,849
[45] Date of Patent: May 26, 1998

[54] TIMING RECOVERY IN A NETWORK-SYNCHRONIZED MODEM

[75] Inventors: Ehud Alexander Gelblum, New York, N.Y.; James Emery Mazo, Fair Haven, N.J.

[73] Assignee: Lucent Technologies Inc., Murray Hill, N.J.

[21] Appl. No.: 413,675

[22] Filed: Mar. 30, 1995

[51] Int. Cl.$^6$ .................................................. H04B 1/22
[52] U.S. Cl. ............................................. 375/222; 379/410
[58] Field of Search .................................... 375/219, 222, 375/229, 230, 231, 346, 348, 296, 285, 364; 379/410, 411; 370/32, 32.1, 523, 528; 364/724.19, 724.2

[56] References Cited

U.S. PATENT DOCUMENTS

| | | | |
|---|---|---|---|
| 3,970,799 | 7/1976 | Colton et al. | 370/523 |
| 4,868,850 | 9/1989 | Kaku et al. | 375/222 X |
| 4,987,569 | 1/1991 | Ling et al. | 379/410 X |
| 5,111,481 | 5/1992 | Chen et al. | 375/232 |
| 5,127,051 | 6/1992 | Chan et al. | 375/222 X |
| 5,394,437 | 2/1995 | Ayanoglu et al. | 375/222 |
| 5,406,583 | 4/1995 | Dagdeviren | 375/216 |
| 5,463,661 | 10/1995 | Moran, III | 375/222 |
| 5,528,628 | 6/1996 | Ayanoglu et al. | 375/222 |

*Primary Examiner*—Tesfaldet Bocure
*Assistant Examiner*—Bryan Webster
*Attorney, Agent, or Firm*—Joseph J. Opalach

[57] ABSTRACT

A timing technique for a Quantization-Level-Sampling (QLS) modem puts timing information in a downstream pulsed signal transmitted from the public switched telephone network (PSTN) to the QLS modem. In response to this timing information, the QLS modem synchronizes to the network sampling clock of the PSTN. In particular, the pulsed signal includes data-bearing samples, which were provided by a far-end QLS modem, and at least one non-user-data-bearing (NUDB) sample in which the level of this NUDB sample periodically alternates. The QLS modem extracts timing information from this periodic alternating signal level to synchronize the QLS modem to the network sampling clock.

8 Claims, 6 Drawing Sheets

| n | $a_n$ | n | $a_n$ | n | $a_n$ | n | $a_n$ | n | $a_n$ |
|---|---|---|---|---|---|---|---|---|---|
| 0 | 0.00 | 26 | 36.50 | 52 | 147.50 | 78 | 471.50 | 104 | 1551.50 |
| 1 | 1.00 | 27 | 38.50 | 53 | 155.50 | 79 | 487.50 | 105 | 1615.50 |
| 2 | 2.00 | 28 | 40.50 | 54 | 163.50 | 80 | 511.50 | 106 | 1679.50 |
| 3 | 3.00 | 29 | 42.50 | 55 | 171.50 | 81 | 543.50 | 107 | 1743.50 |
| 4 | 4.00 | 30 | 44.50 | 56 | 179.50 | 82 | 575.50 | 108 | 1807.50 |
| 5 | 5.00 | 31 | 46.50 | 57 | 187.50 | 83 | 607.50 | 109 | 1871.50 |
| 6 | 6.00 | 32 | 49.50 | 58 | 195.50 | 84 | 639.50 | 110 | 1935.50 |
| 7 | 7.00 | 33 | 53.50 | 59 | 203.50 | 85 | 671.50 | 111 | 1999.50 |
| 8 | 8.00 | 34 | 57.50 | 60 | 211.50 | 86 | 703.50 | 112 | 2095.50 |
| 9 | 9.00 | 35 | 61.50 | 61 | 219.50 | 87 | 735.50 | 113 | 2223.50 |
| 10 | 10.00 | 36 | 65.50 | 62 | 227.50 | 88 | 767.50 | 114 | 2351.50 |
| 11 | 11.00 | 37 | 69.50 | 63 | 235.50 | 89 | 799.50 | 115 | 2479.50 |
| 12 | 12.00 | 38 | 73.50 | 64 | 247.50 | 90 | 831.50 | 116 | 2607.50 |
| 13 | 13.00 | 39 | 77.50 | 65 | 263.50 | 91 | 863.50 | 117 | 2735.50 |
| 14 | 14.00 | 40 | 81.50 | 66 | 279.50 | 92 | 895.50 | 118 | 2863.50 |
| 15 | 15.00 | 41 | 85.50 | 67 | 295.50 | 93 | 927.50 | 119 | 2991.50 |
| 16 | 16.50 | 42 | 89.50 | 68 | 311.50 | 94 | 959.50 | 120 | 3119.50 |
| 17 | 18.50 | 43 | 93.50 | 69 | 327.50 | 95 | 991.50 | 121 | 3247.50 |
| 18 | 20.50 | 44 | 97.50 | 70 | 343.50 | 96 | 1039.50 | 122 | 3375.50 |
| 19 | 22.50 | 45 | 101.50 | 71 | 359.50 | 97 | 1103.50 | 123 | 3503.50 |
| 20 | 24.50 | 46 | 105.50 | 72 | 375.50 | 98 | 1167.50 | 124 | 3631.50 |
| 21 | 26.50 | 47 | 109.50 | 73 | 391.50 | 99 | 1231.50 | 125 | 3759.50 |
| 22 | 28.50 | 48 | 115.50 | 74 | 407.50 | 100 | 1295.50 | 126 | 3887.50 |
| 23 | 30.50 | 49 | 123.50 | 75 | 423.50 | 101 | 1359.50 | 127 | 4015.50 |
| 24 | 32.50 | 50 | 131.50 | 76 | 439.50 | 102 | 1423.50 | | |
| 25 | 34.50 | 51 | 139.50 | 77 | 455.50 | 103 | 1487.50 | | |

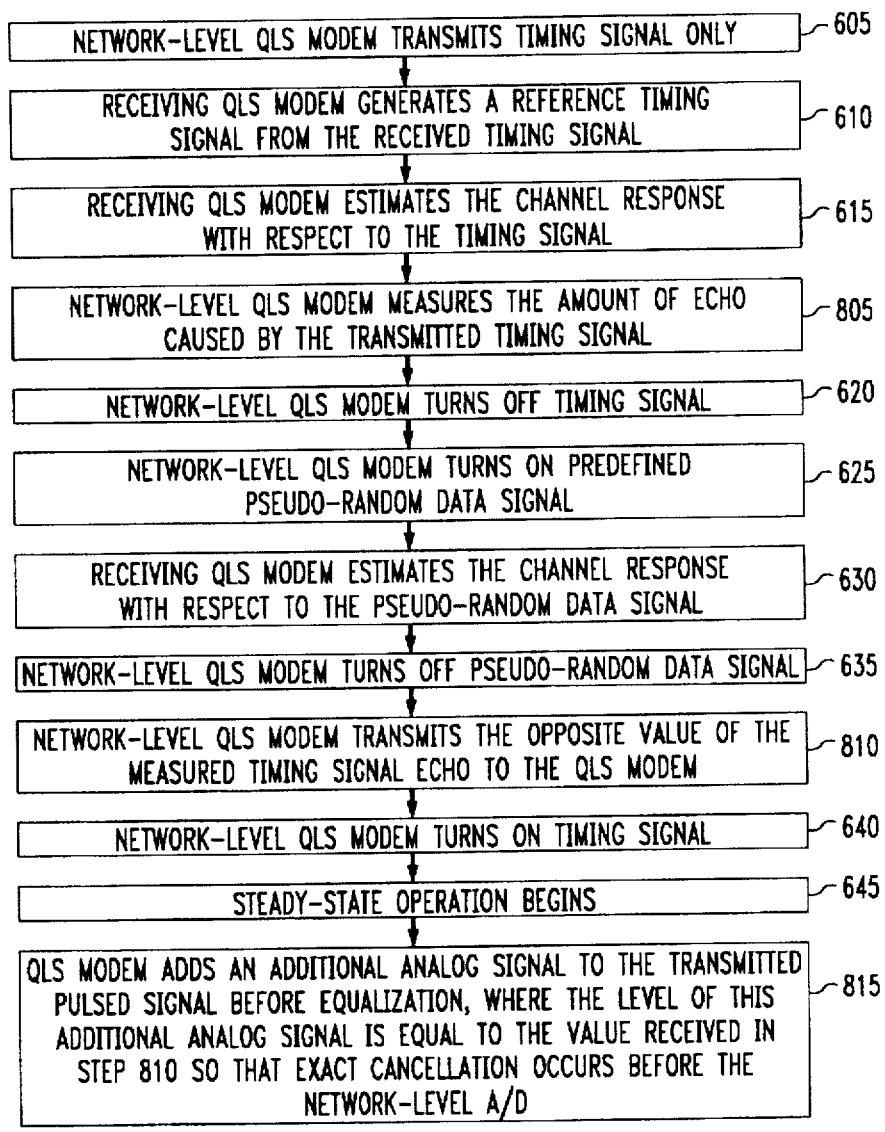
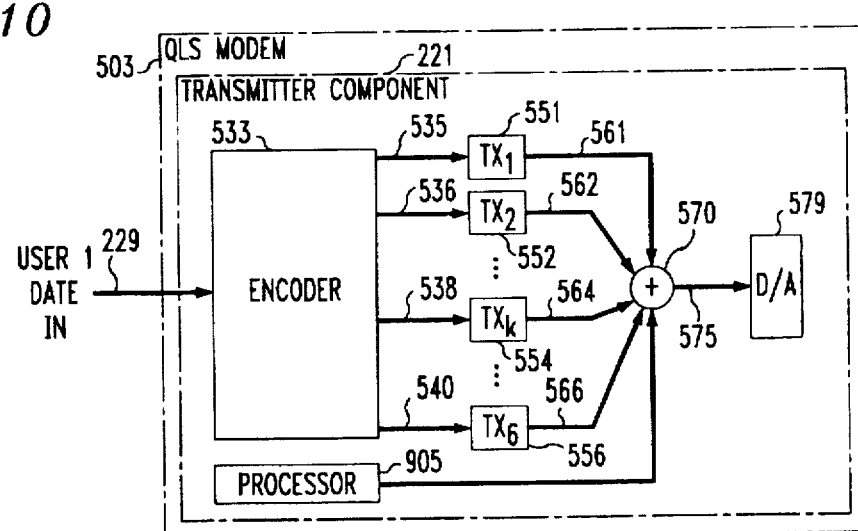

TIMING RECOVERY IN A NETWORK-SYNCHRONIZED MODEM

BACKGROUND OF THE INVENTION

The present invention relates to data communications equipment, e.g., modems, and, more particularly, to modems synchronized to the network.

For a large number of users, the telephone local-loop is still the primary transmission medium between a user's data communications equipment, i.e., a modem, and a local central office, which is a part of the Public Switched Telephone Network (PSTN). The telephone local loop is an analog transmission medium in which modem transmission signals are restricted to the voiceband with a nominal bandwidth of 3.5 kiloHertz (kHz). With the increase in the number and different kinds of data-oriented services, like Prodigy,® available, and the simple accessing of information via the well-known Internet, users have shown the desire to increase the data transmission speeds over the telephone local loop beyond what is currently available in off-the-shelf modems.

In the co-pending, commonly assigned, United States patent applications of: Ayanoglu et al., entitled "A High-Speed Modem Synchronized to a Remote Codec," Ser. No. 07/963,539, filed on Oct. 20, 1992; N. R. Dagdeviren, entitled "A Modem with Received Signals and Transmitted Signals Comprising Signal Sets," Ser. No. 08/080,161, filed on Jun. 21, 1993; and Ayanoglu et al., entitled "High-Speed Quantization-Level-Sampling Modem with Equalization Arrangement," Ser. No. 08/176,742, filed on Jan. 3, 1994; a high-speed modem technology is disclosed that significantly increases the data transmission speed over the telephone local loop. Specifically, these patent applications describe a high-speed modem technology in which a modem is synchronized both in time and quantization levels to the analog-to-digital (A/D) and digital-to-analog (D/A) converters, i.e., quantizing devices, of the PSTN. This synchronization effectively enables a subset of the quantization levels to be used as a signaling alphabet and thereby greatly reduces the quantization noise that is introduced by the PSTN on any transmitted data signals. As a result, data transmission speed is greatly increased. For example, this synchronization approach allows a modem to operate at the PSTN clock rate, and, under certain assumptions, e.g., no bandlimiting in the telephone local loops, a 64 kilo-bit per second (kb/s) data rate can theoretically be achieved over the telephone local loop. A modem using this high-speed modem technology is referred to herein as a "quantization-level-sampling" (QLS) modem, and the signals communicated in a QLS data communications system are referred to herein as "pulsed" signals.

As just mentioned, in order for the modulation scheme of the above-described QLS modem to work, there must be timing synchronization in both the transmit and receive directions between the QLS modem and a network sampling clock in the PSTN. This synchronization is necessary because the network sampling clock controls the sampling instants of any quantizing device located within the PSTN. For example, data symbols transmitted from a QLS modem to its local central office must reach the A/D converter of the local central office at the precise moment that the A/D converter reads each sample. Similarly, a receiving QLS modem must be synchronized to the network sampling clock of its local central office. Unfortunately, any deviations in timing, measured as timing jitter, introduce intersymbol interference into the respective received data signal. At these high data rates, the maximum allowable timing jitter in a QLS data communications system is typically very small. For example, the maximum allowable timing jitter for a data transmission rate greater than 42 kilobits/second (kb/s) can be less than 70 nano-seconds (ns).

SUMMARY OF THE INVENTION

We present a timing system that synchronizes a QLS modem to a network sampling clock in the PSTN. In particular, a timing signal is superimposed on a pulsed signal, which is transmitted from the PSTN to a receiving QLS modem. In response to this received timing signal, the receiving QLS modem synchronizes to the network sampling clock.

In an embodiment of the invention, the pulsed signal includes data-bearing samples, which may be provided by a far-end QLS modem or a source within the network, and at least one non-user-data-bearing (NUDB) sample in which the level of this NUDB sample periodically alternates, or changes. The receiving QLS modem extracts timing information from this periodically alternating signal level to synchronize the QLS modem to the network sampling clock. In addition, the receiving QLS modem uses the extracted timing information to cancel any distortion effects of the NUDB sample on the data-bearing samples of the received QLS signal.

In accordance with a feature of the invention, we have realized that since both the A/D and D/A converters in the PSTN operate from the same network sampling clock, synchronizing the QLS modem to the downstream sampling frequency is equivalent to synchronizing the QLS modem to the upstream sampling frequency. Utilizing this principle, our timing system puts all of the timing information solely in the downstream pulsed signal and the receiving QLS modem acquires synchronization for both directions.

BRIEF DESCRIPTION OF THE DRAWING

FIG. 9 is an illustrative flow diagram of a method for canceling an echo signal of the timing signal; and FIG. 10 is a block diagram of a portion of a transmitter of a QLS modem for use in the method of FIG. 9.

DETAILED DESCRIPTION

Figure 1:
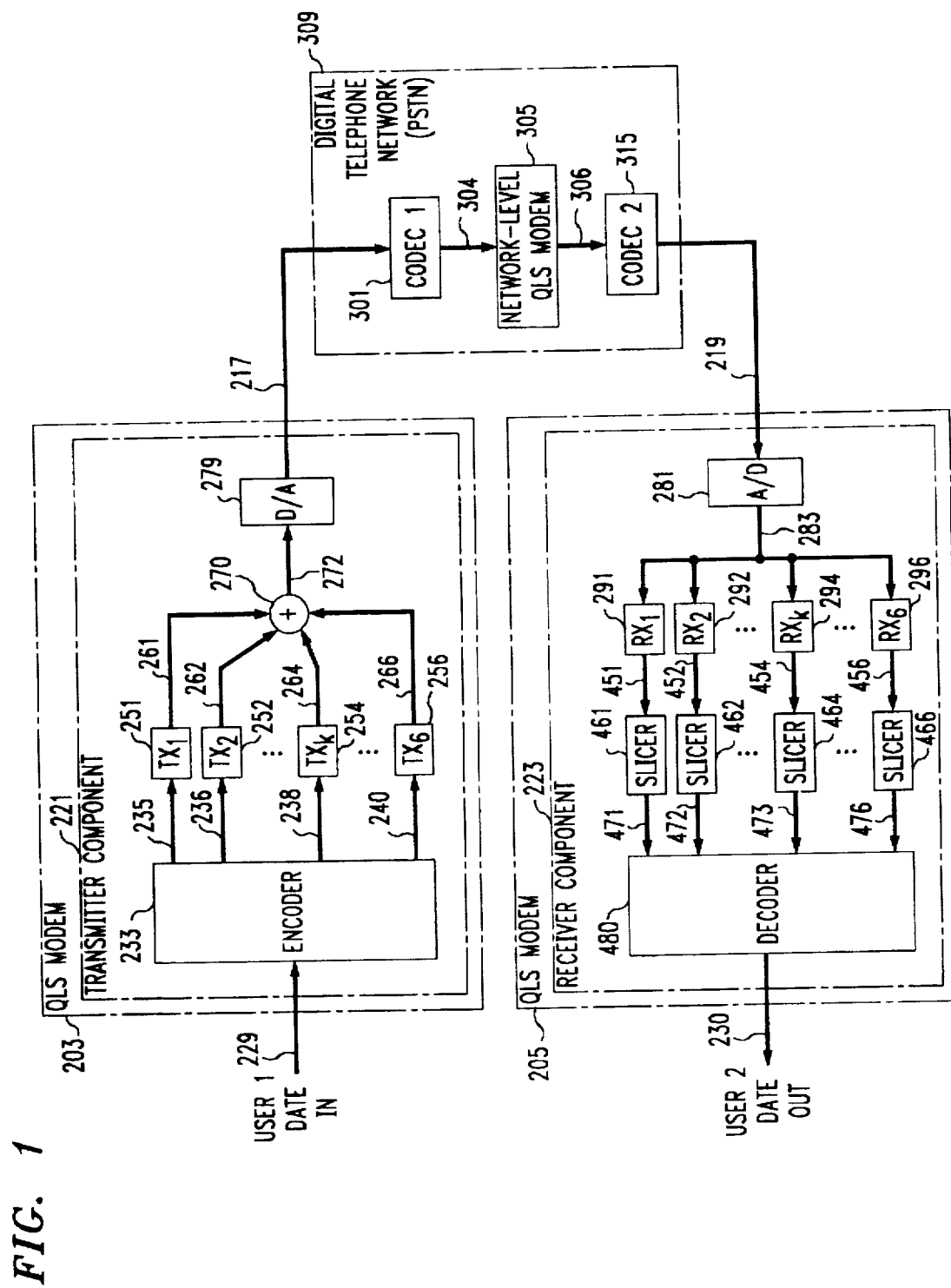
FIG. 1 is a block diagram of a portion of a Quantization-Level-Sampling (QLS) data communications system.

Before describing the inventive concept, the general operation of a QLS data communications system will be described to provide some background information. Additional information, if desired, can be obtained from the above-mentioned United Stated patent applications. FIG. 1 is a block diagram of a QLS data communications system that includes QLS modem 203, PSTN 309, and QLS modem 205. For simplicity, only the direction of transmission from QLS modem 203 to QLS modem 205 is shown in FIG. 1 and will be described below. Transmission in the opposite direction, i.e., from QLS modem 205 to QLS modem 203, occurs in a similar fashion. It is assumed that a data connection between QLS modem 205 and QLS modem 203 already exists, e.g., call setup, training, etc., have been completed and data is being communicated between QLS modem 205 and QLS modem 203.

It is also assumed in the example that PSTN network 309 operates at a sampling rate of 8000 samples/s and employs μ-law codecs 301 and 315, which include a bandlimiting filter that limits the response of telephone local loops 217 and 219 to a nominal frequency range of 300 Hz–3.3 kHz. Thus local loops 217 and 219 can be considered to have available 6 kHz of two-sided bandwidth. As known in the art, μ-law codecs 301 and 315 are coder-decoders, which utilize μ-law coding to convert an analog signal to a digital representation and vice versa. Data transmission occurs in a digital format across PSTN 309 through network-level QLS modem 305 (described below). A similar scenario exists in the European phone networks with the exception that μ-law codecs 301 and 315 are replaced by A-law coder-decoders. Since European A-law coding is completely analogous to the American μ-law counterpart, all processes described in this patent apply equally to both. The underlying concept of a QLS modem is one in which the QLS modem is synchronized both in time and quantization levels to the analog-to-digital (A/D) and digital-to-analog (D/A) converters, i.e., quantizing devices, of the PSTN. This synchronization greatly reduces the quantization noise that is introduced by the PSTN on any transmitted data signals and, as a result, greatly increases data transmission speed.

The synchronization in quantization levels is achieved by utilizing, in each QLS modem, the μ-law quantization levels themselves as the signaling alphabet. As a result, each data symbol is equivalent to one of the 255 μ-law quantization levels, or sample levels, and thus representative of approximately eight user data bits. Thus the transmitted data symbol sequence is explicitly transported across the network in digital form.

From basic Nyquist theory, it is known that a channel with two-sided bandwidth of W Hz is capable of supporting low-distortion signaling at a rate no greater than W symbols/s. Thus, with the approximately 6 kHz of available two-sided local loop bandwidth, the maximum symbol rate is around 6000 symbols/s. Since the μ-law sample levels are used as the signaling alphabet, this maximum symbol rate is equivalently stated as 6000 samples/s.

In contrast, it has been assumed that PSTN 309 is capable of sampling 8000 samples/s. As a result, at most 6 out of every 8 samples received by PSTN 309 can be arbitrarily chosen. In other words, it is not possible to choose 8000 independent samples/s and pass them through the modem when the output of the modem is band-limited to 6000 samples/s. Since, in this example, each of these 6000 samples/s represents 8 bits, then a transmission rate of up to 48 kbps is feasible over a telephone local loop even when practical bandwidth consideration is taken into account.

Stated generally, the resultant analog signal from QLS modem 203 is referred to herein as a "pulsed signal" in which analog samples are sent in groups of M symbols, or samples, in a sequence of frames. Each frame comprises N clock periods, where each clock period is equal to the period of the network sampling clock, $T_s$, of PSTN 309. The period of the frame, $T_p$, is, therefore, equal to $NT_s$. In each frame of the pulsed signal, the group of M samples is referred to herein as the "user-data-bearing" (UDB) samples, while the group of (N–M) samples is referred to as "non-user-data-bearing" (NUDB) samples. In this example, M=6 samples are sent in a frame comprising N=8 clock periods, where, for 8000 samples/s, the period of the network sampling clock, $T_s$, is equal to 125 micro-seconds (μsec.), and, therefore, $T_p$=1 milli-second (msec.). Thus, 6 out of every 8 of the output samples are driven to the transmitted quantization level, i.e., are UDB samples, while the remaining two samples are NUDB samples. Since under Nyquist theory the NUDB samples cannot be arbitrarily chosen, they are set to zero by QLS modem 203 and network-level QLS modem 305 (described below).

In order for QLS modem 203 to provide a 6000 sample/s data rate over local-loop 217, additional design considerations must be taken into account. As described in the above-mentioned United States patent application of Ayanoglu et al. entitled "High Speed Quantization-Level-Sampling Modem with Equalization Arrangement," it has been shown that if a signal, h(t), has two sided non-vanishing spectral support at at least M of the Nyquist frequency translates (f+l/T), l=0, ±1, ±2, . . . of all f for $|f| \leq 1/(2T)$, then it is possible to specify transmitter and receiver filters such that each of M data streams, from M users, can be recovered without interference from the other data streams. A set of transmitter and receiver filters realizing this state of affairs may be referred to as meeting the generalized zero-forcing (GZF) criterion as known in the art. As pointed out in the above-mentioned United States patent application of Ayanoglu et al., this analysis can be extended to show that if either the set of transmitter filters or the set of receiver filters is fixed, one has the flexibility to choose the other set provided that the fixed set satisfies certain spectral requirements. In particular if the members of the fixed filter set are purely delay elements and if no two of the delay values are identical, then these spectral requirements are nearly always satisfied, and it is possible to choose the other set of filters so as to realize the GZF criterion. This notion forms the basis for the design of a QLS modem in which a single user transmits a rate-M/T symbol sequence, but with nonuniform time spacing between the symbols.

FIG. 1 shows an illustrative block diagram of the transmitter portion of QLS modem 203, which provides a pulsed signal on line 217. User data 229 is applied to transmitting QLS modem 203 at a rate of approximately 48 kbps if no restrictions are imposed on the use of quantization levels. Encoder 233 encodes user data 229 into six parallel 1000 symbols/s channel symbol streams 235–240, i.e., encoder 233 illustratively provides a rate-M/T sample stream, where M=6, and 1/T=1 kHz. As mentioned above, encoder 233 utilizes the μ-law quantization levels themselves as the signaling alphabet. Transmitting component 221 includes six transmitter filters 251–256, each such filter (or transmitter equalizer) operating on one of the channel symbol streams. Transmitter filter outputs 261–266 are summed in transmitter summer 270, and the summer output signal 272 is converted to analog form and filtered by digital-to-analog converter 279. The latter provides a pulsed signal for transmission over subscriber loop 217 to a local central office (not shown) of PSTN 309.

At the central office (not shown) of PSTN 309, codec 301 filters and samples the pulsed signal at a rate of 8000 samples/s, and quantizes and encodes these sample voltages into a DS0 digital sequence, which is transported through PSTN 309 passing through network level modem 305

Figure 2:
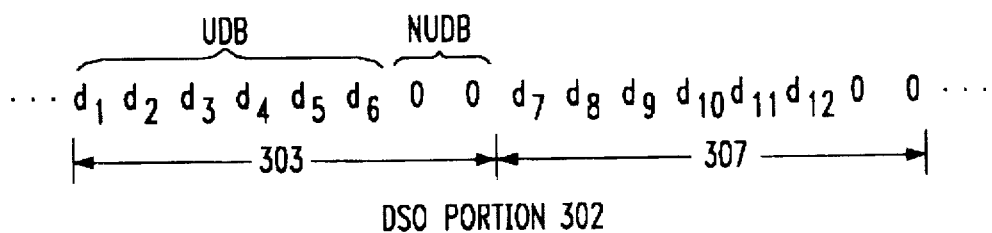
FIG. 2 shows an illustrative portion of a DS0 representation of a pulsed signal provided by a QLS modem.

(described below) to codec 315. An illustrative portion of this modified DS0 digital sequence is illustratively shown in FIG. 2. DS0 portion 302 is a digital representation of the pulsed signal on line 217 over frame 303 and frame 307. The UDB samples are represented by $d_i$, (i=1 to 12), while the NUDB samples are set to zero.

To complete the signal transmission from transmitting QLS modem 203, codec 315 converts the DS0 sequence into another pulsed signal which is transmitted on subscriber loop 219 to receiving QLS modem 205. This pulsed signal is received by receiver component 223 of QLS modem 205. The received pulsed signal is converted to digital form by A/D converter 281, which samples at a rate of 8000 samples/s. The resultant digital signal 283 is operated on by six parallel receiver filters 291–296. The kth receiver filter (or receiver equalizer) $RX_k$ 294 produces a stream of digital samples 454 at a rate of 1000 sample/s, these samples being estimates of the corresponding transmitted sample stream 238 input to the kth transmitter equalizer $Tx_k$ 254 of QLS modem 203. Sample streams 451–456 are operated on by slicers 461–466 which map each sample to the 8-bit word corresponding to the nearest one of the 255 possible μ-law sample levels. The six slicer output symbol streams 471–476 are operated on by decoder 480 which maps the six 1000 symbols/s channel symbol streams into single user data output stream 230 at a rate of up to 48 kbps.

Having generally described the operation of a QLS data communications system, network-level QLS modem 305 will now be described. Network-level QLS modem 305 represents a pool of such network-level QLS modems that are a part of a high-speed data service offering provided by PSTN 309. This pool can be accessed in any number of ways, e.g., via a predefined telephone number associated with this high-speed data service. Once this pool is accessed, the subsequent data connection is then switched through to network-level QLS modem 305. The latter implements a code conversion process as described in the above-mentioned United States patent application of N. R. Dagdeviren, entitled "A Modem with Received Signals and Transmitted Signals Comprising Signal Sets." This code conversion process compensates for the hybrid leakage that occurs within PSTN 309 and ensures the NUDB samples are set to zero. For the purposes of this example, it is assumed each network-level QLS modem simply receives and transmits a digital representation of a pulsed signal.

Figure 3:
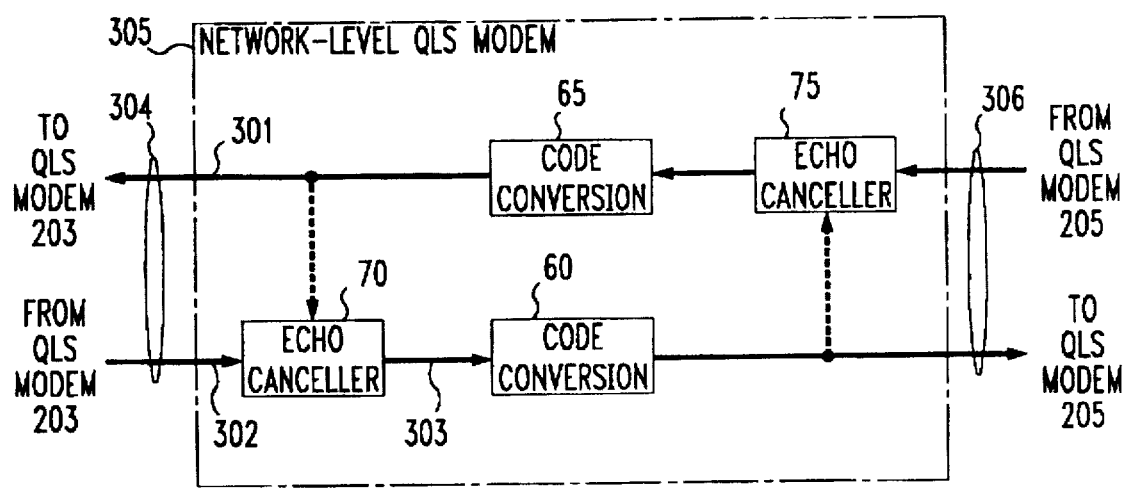
FIG. 3 is a block diagram of a network-level QLS modem.

An illustrative embodiment of a network-level QLS modem is shown in FIG. 3. Network-level QLS modem 305 comprises digital signal processors (DSP's) and associated circuitry to handle the tasks of echo cancellation and code conversion. It is assumed that lines 304 and 306 are already in digital DS0 format, having been filtered and quantized in the local exchange office A/D converters. Network-level QLS modem 305 is coupled into the QLS data connection via lines 304 and 306. In particular, digital signal 301 is used by echo canceller 70 to estimate the echo in line 302. Code converter 60 converts the Data Bearing samples on line 303 from its receive constellation to its transmit constellation and sends them out line 306 to the local carrier. For the purposes of this description, the code conversion performed by code converters 60 and 65 is not important.

The recovery of timing in any network QLS data communications equipment, e.g., QLS network-level modem 305, is not a concern since any network device implicitly receives a clear timing signal within the network. However, as mentioned above, in order for the modulation scheme of the above-described QLS modem to work, there must be timing synchronization in both the transmit and receive directions between the QLS modem and a network sampling clock of the PSTN. This synchronization is necessary because the network sampling clock controls the sampling instants of any quantizing device located within the PSTN. For example, data symbols transmitted from a QLS modem to its local central office must reach the A/D converter of the local central office at the precise moment that the A/D converter reads each sample. Similarly, a receiving QLS modem must be synchronized to the network sampling clock of its local central office. Unfortunately, any deviations in timing, measured as timing jitter, introduce intersymbol interference into the respective received data signal since the quantizing device is no longer sampling the signal at the zeroes of the other pulses. At these high data rates, the maximum allowable timing jitter in a QLS data communications system is typically very small. For example, the maximum allowable timing jitter for a data transmission rate greater than 42 kilobits/second (kb/s) can be less than 70 nano-seconds (ns).

As described in the above-mentioned U.S. Patent application of Ayanoglu et al. entitled "A High Speed Modem Synchronized to a Remote Codec," a number of synchronization methods were suggested. All of these techniques generally focused on a receiving QLS modem equalizing a training signal during the start-up portion of a QLS data connection. From this equalization, timing delays can be adjusted as is known in the art. Thereafter, the conventional adaptive equalization approach can be taken to maintain timing. Since synchronization in a QLS modem is required in both the transmit and received directions, this equalization is performed on both the transmit and receive paths.

While the above-described equalization approaches could be used to synchronize a QLS modem to a network sample clock, we present an alternative timing system. In accordance with the invention, a timing signal is superimposed on a pulsed signal, which is transmitted from the PSTN to a receiving QLS modem. In response to this received timing signal, the receiving QLS modem synchronizes to the network sampling clock frequency.

In the following description, it is implicitly assumed that any internal network-timing jitter is either very small high-frequency jitter so that sample-to-sample variations are not severe, e.g., on the order of 10 to 20 ns, or the jitter is long-term and can be tracked by a phase-locked loop (PLL), with only a small degradation caused by the round-trip delay accumulated in the path from PSTN 309 to the receiving QLS modem and back again.

As described above, in a pulsed signal, the NUDB samples cannot be used to transport arbitrary data, as this would violate the Nyquist limitation of 6000 samples/s for the 6 kHz of available bandwidth on the telephone local loop. In particular, for M=6 and N=8, attempting to use the two NUDB samples to transmit arbitrary data results in the introduction of intersymbol interference which can not be mitigated by any linear receive equalizers. However, we have realized that a class of non-zero NUDB samples can be used to synchronize the receiving modem to a network sampling clock without inducing non-mitigatable interference at the receiver. In particular, the method we propose calls for superimposing, i.e., explicitly adding, a pure tone (and concomitant harmonics) onto the downstream transmission stream from the network to the receiving QLS modem. This tone is inserted solely through the manipulation of one of the unused samples in each frame so as not to alter the values of any of the information-carrying data samples.

Figure 4:
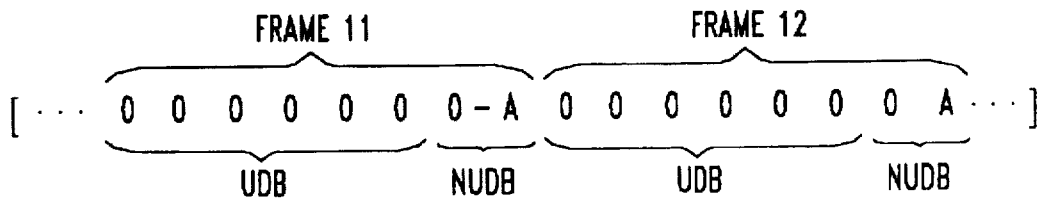
FIG. 4 is an illustrative timing pattern embodying the principles of the invention for use in a QLS data communications system.
Figures 5, 6:
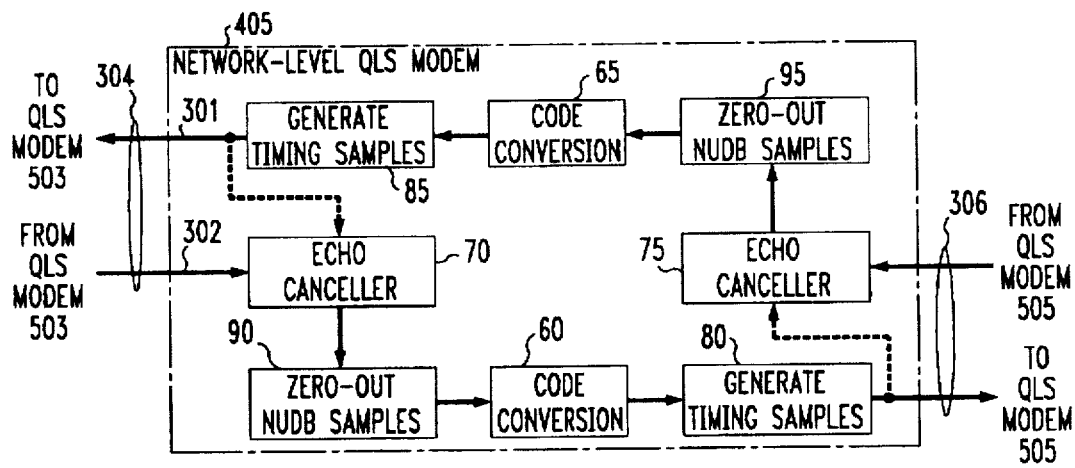
FIG. 5 is representative μ-law coding table.
FIG. 6 is a block diagram of a portion of a network-level QLS modem embodying the principles of the invention.

Continuing with the example from above, it is assumed a 6-out-of-8 pulsed signal scheme is used, whereby 6 samples send data, i.e., are UDB samples, followed by 2 unused time slots. Although described for illustrative purposes as being contiguous, it is not required that the NUDB samples or the UDB samples within a frame be contiguous. In an embodiment of the invention, the last sample of each 8-sample frame, which normally would be held to zero, is set alternately to a level of +A and −A in consecutive frames. That is, in a frame period, $T_p$, the pulsed signal includes data-bearing samples, which were provided by the far-end QLS modem, and at least one non-user-data-bearing (NUDB) sample in which the level of this NUDB sample alternates. This is illustrated in FIG. 4 by frames 11 and 12, which represent the timing pattern that is superimposed on a pulsed signal transmitted to a receiving QLS modem. In general, for full-duplex transmission the choice of A is a compromise between strong received tones at the modem versus low cross-talk of the tones through the hybrid. In the downstream direction, e.g., from PSTN network 304 to a receiving QLS modem, A was chosen to be level 64, or 247.5 units out of a maximum of 4015.5 units. These units conform to the well-known μ-law coding as shown in FIG. 5.

This superimposed pattern of [... - A 0 0 0 0 0 0 0 A 0 0 0 0 0 0 0 - A ...] creates a menagerie of individual tones, but the inband tones (≦4 kilohertz (kHz)) are at 500, 1500, 2500, and 3500 Hertz (Hz). In this example, the 1500 Hz tone is used as the timing reference. While the other tones are superfluous, manufacturing only one tone would require adding a signal to the 6 UDB samples. Although this could be done, this is undesirable for two reasons. First, since the downstream signal samples are selected from a discrete-values alphabet (the μ-law levels), creating a perfect tone may prove to be impossible. Second, requiring the data-carrying samples to "share" dynamic range with the timing information effectively reduces the available dynamic range for the actual data.

In fact, the more general periodic pattern [... - A 0 0 0 0 0 0 0 B 0 0 0 0 0 0 0 - A ...] can also be used. For this example, tones at multiples of 1000 Hz would also be created if A≠B.

Since the downstream transmission is clocked out by the D/A converter in the central office, the four superimposed inband tones arrive at the receiving QLS modem possessing frequencies precisely determined by the frequency of the network device. The receiving QLS modem extracts timing information from this periodic alternating signal level to both synchronize the QLS modem to the network sampling clock, and to cancel any distortion effects of the NUDB samples on the data-bearing samples of the received QLS signal.

In this example, it is assumed that the timing signal is superimposed onto a transmitted pulsed signal by a network-level QLS modem. FIG. 6 is a block diagram of a network-level QLS modem embodying the principles of the invention. Network-level QLS modem 405 of FIG. 6 replaces network-level QLS modem 305 of FIGS. 1 and 3. Network-level QLS modem 405 is similar to network-level QLS modem 305 except for the addition of timing procedures 80, 85, 90, and 95. As in FIG. 3, lines 304 and 306 are assumed to provide digital DS0 information to/from the local exchange office, echo cancellers 70 and 75 provide relative immunity to trans-hybrid echo, and code converters 60 and 65 mediate between receive and transmit constellations. In addition, processes 90 and 95 zero-out the energy in the NUDB samples caused by a confluence of intersymbol-interference and near-hybrid echo. Processes 80 and 85 generate timing samples to be inserted into the just-zeroed out NUDB samples before signals 304 and 306 are transmitted back to the local exchange offices.

Figure 7:
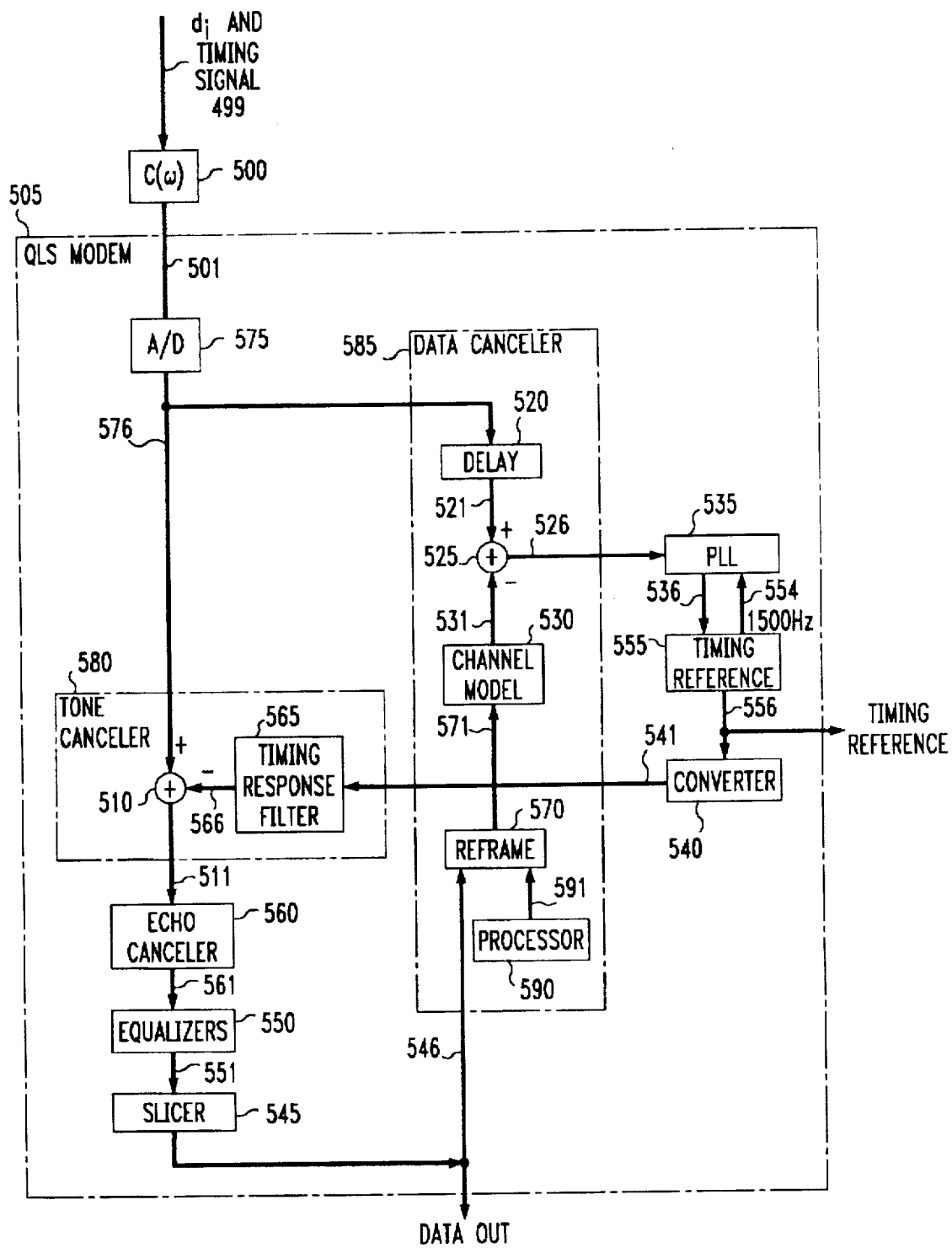
FIG. 7 is a block diagram of a portion of a QLS modem embodying the principles of the invention.

FIG. 7 is a block diagram of a portion of a QLS modem embodying the principles of the invention. For simplicity, only the receiver portion of QLS modem 505 is described. As noted above, network-level QLS modem 405 sends a stream of data ($d_i$) interleaved with timing tone (±A) in the described data format, [... $d_1$ $d_2$ $d_3$ $d_4$ $d_5$ $d_6$ 0 A $d_7$ $d_8$ $d_9$ $d_{10}$ $d_{11}$ $d_{12}$ 0 -A ...]. This stream of data passes through the codec filters and telephone local-loop and receive filter, the cascade of which is represented by the channel response function C(ω) as represented by element 500, and arrives at receiving QLS modem 505, via line 501, where it is converted to digital format by analog-to-digital converter 575.

The received signal is applied to tone canceler 580 of QLS modem 505. The latter includes timing response filter 565 and adder 510. Timing response filter 565 provides a signal representing a sampled estimate to the received timing signal itself. The estimate of the channel response to the timing signal is represented herein by $\hat{C}_2$, which is determined in a startup phase, described below. Adder 510 subtracts the output signal of timing response filter 565 from the received pulsed signal thereby removing, or canceling, the timing signal from the received pulsed signal. Consequently, the signal provided by adder 510 via line 511 is, ideally, a data-only signal. The latter is applied to echo canceler 560, equalizer 550, and slicer 545 for recovery of the data signal, which is provided on line 546.

The recovered data signal is also applied to data canceler 585. The latter includes reframe element 570, channel-model filter 530, delay element 520, and adder 525. After the data signal is recovered, it is reframed into blocks of 8 (6 data symbols followed by 2 zeroes) by reframe element 570 and passed back through channel-model filter 530. The latter filter provides an estimate of the channel response to the data signal. This estimate is represented herein as $\hat{C}(\omega)$ which is determined in the startup phase, described below. Finally, adder 525 subtracts the output signal of channel-model filter 530 from a delayed version of the original incoming signal, which is provided by delay element 520 (described below), to thereby cancel the data signal and provide an estimate of the timing signal via line 526. Timing recovery is performed by phase-locked loop (PLL) 535, which locks onto the received 1500 Hz tone and controls timing reference 555 to provide a reference timing signal, $\hat{T}_r$, on line 556, that is representative of the same 8000 Hz sample clock that created the tone. In particular, timing reference 555 provides reference timing signal $\hat{T}_r$ on line 556 and also derives a 1500 Hz signal from $\hat{T}_r$ that is provided on line 554. PLL 535 compares the 1500 Hz signal generated by timing reference 555 to the received 1500 Hz tone and adjusts timing reference 555 to synchronize the two 1500 Hz signals, thereby also synchronizing $\hat{T}_r$ to the network clock. Experimentally, a PLL with a bandwidth of 0.1 Hz bandwidth was used. In addition, the reference timing signal, $\hat{T}_r$, is then applied to converter 540 which, like reframe element 570, regenerates the timing pattern, which is applied to timing response filter 565, via line 541. In response to this regenerated timing pattern, timing response filter 565 provides the estimate of the channel response to the timing signal, described above.

One benefit of this technique is the simple nature of timing response filter 565 due to the periodicity of the tones. That is, the number of taps is just twice the number of samples in a frame. In this example, since a 6-out-of-8 pulsed signal scheme is used, timing response filter 565 need only be 16 taps long. Further, the last 8 taps are related to the first 8 by the simple relation, $\hat{C}_2(i) = -\hat{C}_2(i-8)$ where $8 \leq i \leq 15$, so only 8 locations in memory need to be stored in timing response filter 565.

For example, the sequence of +A's is placed at $T=16\,T_s$. It is a fundamental identity that the frequency spectrum of the tones can be represented by:

$$A \sum_{n=-\infty}^{\infty} \exp(i\omega T) = \frac{A}{T} \sum_{m=-\infty}^{\infty} \delta(f - mf_0), \quad (1)$$

where $f_0 = 1/T$. In the present situation $f_0 = 500$ Hz. There is a similar representation for $-A$ pulses, which are displaced by $T/2$. In particular, $$-A \sum_{n=-\infty}^{\infty} \exp\left(-i\omega\left(nT + \frac{T}{2}\right)\right) = -\frac{A}{T} \sum_{m=-\infty}^{\infty} (-1)^m \delta(f - mf_0), \quad (2)$$

Adding equations (1) and (2) yields:

$$\frac{2A}{T} \sum_{\substack{m=-\infty \\ m\,\text{odd}}}^{\infty} \delta(f - mf_0)$$

Thus, from equation (3), the time domain expression for the generated timing signal, herein referred to as tones(t)) is:

$$\text{tones}(t) = \frac{4A}{T} \sum_{\substack{m=1 \\ m\,\text{odd}}}^{\infty} \cos(2\pi mf_0 T). \quad (4)$$

After passing through a linear channel as represented by the above-described channel response function $C_2(\omega)$, the QLS modem receives a tone signal equal to:

$$\text{received tones}(t) = \sum_{\substack{m=1 \\ m\,\text{odd}}}^{\infty} a_m \cos(2\pi mf_0 t + \phi_m), \quad (5)$$

with $a_m$ and $\phi_m$ representing the attenuation and phase shift components of $C_2(\omega)$ at frequency $mf_0$. Presumably for $m>7$ the $a_m$ are negligible because of channel and filter attenuations.

Returning to equation (5), each individual component tone of frequency $mf_0$ has a period which is a submultiple of $T$, and each tone changes sign for a time displacement of $T/2$. Hence, $$\text{received tones}(t) = \text{received tones}(t+kT), \text{ where } k=0, \pm 1, \pm 2, \ldots \quad (6)$$

$$\text{received tones}(t) = -\text{received tones}\left(t + \frac{T}{2}\right). \quad (7)$$

Thus assuming out-of-band tones have negligible power, the in-band tones may be canceled by subtracting the output of a clocked 16-tap delay line whose values are the $16T_s$-spaced values of the tone signal. This is the function of tone canceler 580 in FIG. 7. As described below, these values are learned during an initial training step when no data is being sent. Further, from equation (7), only eight consecutive values need be remembered; the other eight are the negatives of these.

Figure 8:
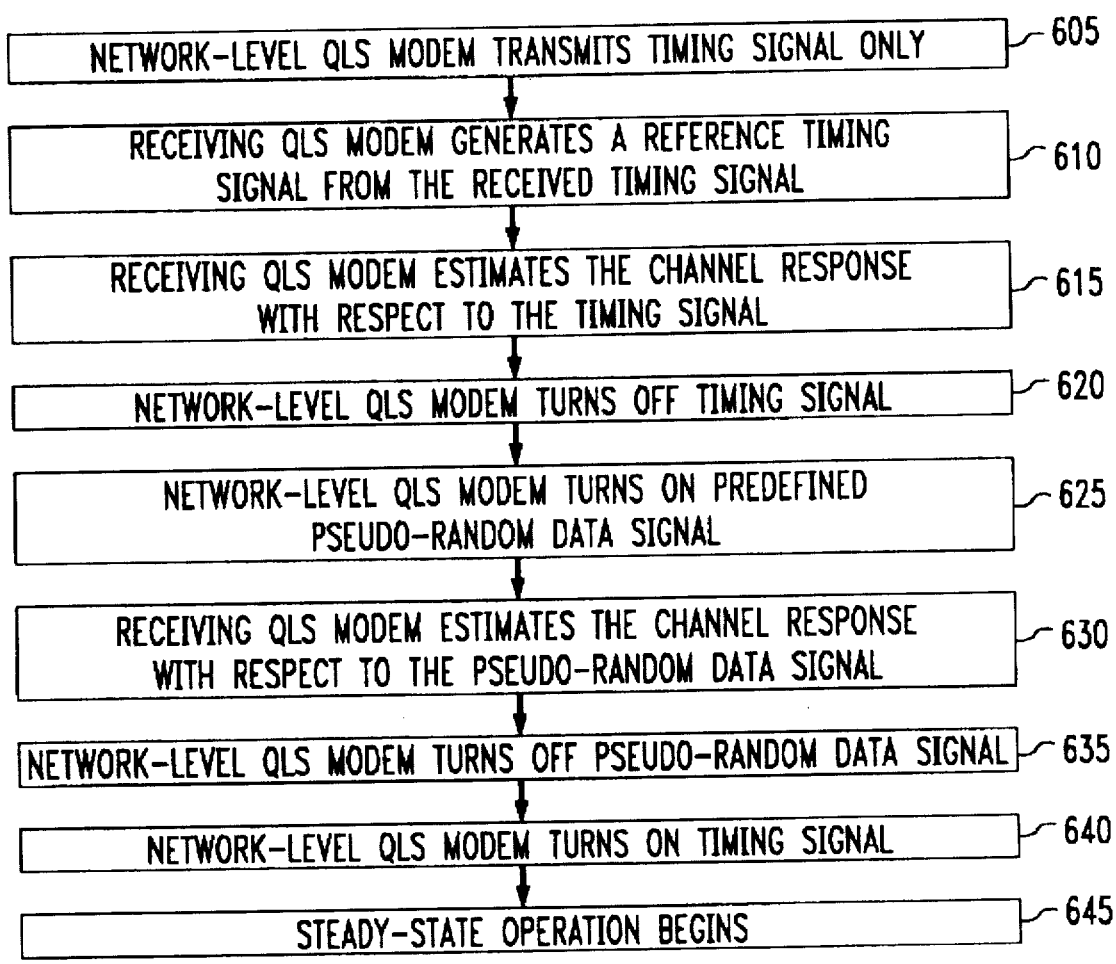
FIG. 8 is an illustrative flow diagram of a startup phase embodying the principles of the invention.

The above description assumed that the respective channel response functions $\hat{C}_2$ and $\hat{C}(\omega)$, used by timing response filter 565 and channel-model filter 530, respectively, were determined in a startup, i.e., training, phase. An illustrative portion of a startup phase is shown in FIG. 8. Other elements of a training phase, e.g., data rate negotiation, etc., are not shown.

In step 605, of FIG. 8, network-level QLS modem 405 transmits only the timing signal as shown in FIG. 4 to QLS modem 505. From this reference clock, QLS modem 505 generates a timing signal in step 610 on line 541. In particular, delay element 520 provides a bulk delay of N taps and represents the propagation delay through equalizer 550.

The value of N should be half the length of an equalizer. Since an equalizer can be on the order of 100 taps, N is illustratively equal to a delay of 50 taps. Since no data signal is currently being transmitted, adder 525 provides the output signal from delay element 520 directly to PLL 535. The latter locks onto the 1500 Hz tone, and derives an estimate of the 8000 Hz sampling clock, $T_s$. This estimate is applied to timing response filter 565.

After PLL 535 is locked and $T_s$ is estimated, QLS modem 505 then estimates the channel response with respect to the timing signal, i.e., QLS modem 505 determines $\hat{C}_2$, in step 615. In this step, timing response filter 565 samples every $\hat{T}_s$ seconds and averages the received signal, which is only the timing signal, to accurately learn the 16-sample channel response to the timing signal. (As noted earlier, only 16 taps are required to implement the channel response to the timing signal.) These learned samples are then stored in memory (not shown) of timing response filter 565 as the 16 taps of timing response filter 565.

After step 615, network-level QLS modem 405 turns off the timing signal in step 620 and begins to transmit a predefined training signal in step 625. This training signal is a predefined pseudo-random sequence, $a_k$, which can be binary, that is sent from network-level QLS modem 405 at a rate $1/T_s$, using all time slots. In step 630, the channel estimate $\hat{C}(\omega)$ is formed by QLS modem 505. (Since $C(\omega)$ is not actually known, it is estimated by $\hat{C}(\omega)$, which is an approximation of the channel response across the entire bandwidth.) The received training signal is delayed by delay element 520 and applied to adder 525. In addition, processor 590 applies a delayed-by-N version of the same sequence, $a_k$, to channel model 530 via reformatter 570. Channel model 530 is an adaptive filter that adaptively adjusts the error between the channel and channel-model outputs to zero. This error signal is provided by adder output 526. It is assumed that step 630 is performed quickly enough so that PLL 535 does not begin to drift, i.e., it is assumed that PLL 535 runs free during this step. It should be noted that the resulting $\hat{C}(\omega)$ includes the channel delay.

Once the channel model adaptation is completed, network-level QLS modem 405 turns off the pseudo-random data signal in step 635 and turns back on the timing signal in step 640 to re-lock PLL 535 of QLS modem 505. In addition, the estimated channel model, $\hat{C}(\omega)$, is used off-line by QLS modem 505 to rapidly train equalizer 550 in step 635. For more information, see the above-mentioned U.S. Patent application of Ayanoglu et al. entitled "High Speed Quantization-Level-Sampling Modem with Equalization Arrangement." Alternatively, equalizers 550 can be trained directly from another training signal, but the slowness of real-time and the unavoidable noise caused from slight momentary timing misadjustments currently make this a less than desirable option.

Finally, steady state operation begins in step 645. Tone cancellation is introduced, equalizer 550 is brought on line and their output data estimates are sent through the channel model 530 to subtract the data background, providing a relatively clean (high signal-to-noise ration (SNR)) timing signal to PLL 535 for final locking purposes.

In the above setup phase, it was assumed that the overall channel response, $\hat{C}(\omega)$, and the channel response to the timing signal, $\hat{C}_2$, does not change, or, if they do, they each change very slowly. If during data communications, the error rate increases beyond a predefined point, it is assumed that a re-training is performed to estimate anew these channel responses.

In accordance with a feature of the invention, we have realized that since both the A/D and D/A converters in the PSTN operate from the same network sampling clock, synchronizing the QLS modem to the downstream sampling frequency is equivalent to synchronizing the QLS modem to the upstream sampling frequency. That is, since the network A/D converter "seen" by a transmitting QLS modem uses the same network clock, the transmitting QLS modem knows the network A/D sampling frequency as well. Any fixed relative phase shift between network and the transmitting QLS modem is then accounted for by including it as part of the channel characteristic in the upstream direction. Illustratively a network-level QLS modem first "learns the channel" during the above described startup phase. In this startup phase, the network-level QLS modem receives a pseudo-random data sequence, which is provided by the QLS modem, and calculates a channel response. This channel response includes any time delay. The network-level QLS modem then sends the calculated channel response back to the QLS modem. Utilizing this principle, our timing system puts all of the timing information solely in the downstream pulsed signal and the receiving portion of the QLS modem acquires synchronization for both directions.

One point should be noted for completeness. Even for half-duplex transmission in the upstream direction, a timing signal must still be sent downstream to a QLS modem. However, because of the hybrid in the central office of the PSTN, this timing signal causes cross-talk into the analog segment of the upstream direction. That is, an echo of this timing signal appears in the upstream transmission. This echo can be treated like the usual hybrid-induced cross-talk encountered in full-duplex transmission, e.g., this echo can be eliminated with an echo canceler in the above-described network-level QLS modem. However, we have realized that another possibility is to cancel this echo of the timing signal by adding appropriate analog samples at the transmitting QLS modem during upstream transmission. In other works, the transmitting QLS modem now adds an additional analog signal to cancel any echo of the transmitted timing signal caused by a network hybrid. This allows the transmitted timing signal to increase in power without regard to the corresponding increase in the echo signal, since the echo is subsequently canceled by the transmission of the additional analog signal. The higher the transmitted power of the timing signal—the better the ability of the receiving QLS modem to track it.

An illustrative method for canceling the echo signal generated by the transmission of a timing signal from the PSTN to a receiving QLS modem is shown in FIG. 9. The latter is the same as FIG. 8 except for the addition of steps 805, 810, and 815. In step 805, network-level QLS modem 405 measures the amount of echo signal received as a result of the transmission of the timing signal to QLS modem 505 during the setup phase. This measurement can be performed in any number of ways, e.g., since no data signal is being transmitted, any samples in a frame in the upstream direction should, ideally, be equal to zero. Therefore, any measured signal level is equal to the echo of the transmitted timing signal. Latter in the setup phase, the opposite value of the measured echo signal is transmitted to QLS modem 505 in step 815. QLS modem 815 then adds an additional analog signal equal to this opposite value to any transmitted pulsed signal in step 820. As a result, and in accordance with the principles of this invention, the subsequent addition of the echo signal to the transmitted signal by the hybrid of the PSTN results in the cancellation of the echo signal.

A portion of a transmitter of QLS modem 505 is shown in FIG. 10, which is similar to transmitter 221 of FIG. 1 except for the addition of processor 905. The latter generates the opposite value analog signal for addition to the transmitted pulsed signal via adder 270. This opposite value analog signal is added across all samples of a frame. Consequently, the dynamic range of the underlying data signal is correspondingly reduced.

Although the inventive concept was described in the context of superimposing a timing signal on a pulsed signal through the use of at least one alternating NUDB sample, it should be realized that any timing signal could also be superimposed on at least one UDB sample. In this instance, the timing signal does not have to be generated from a network-level device. Indeed, the source of the timing signal could be anywhere, e.g., the transmitting QLS modem. However, as noted earlier, the use of a UDB sample restricts the dynamic range of the underlying data signal since this UDB sample represents the addition of the underlying data signal and the timing signal. In addition, it should be realized that if the quantizing devices located within the respective local central offices are too coarse, either some of the timing signal may be interpreted as data, or some of the data signal may be interpreted as a timing signal. Similarly, a combination of NUDB and UDB samples could be used to transport a timing signal.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the invention is illustrated herein as being implemented with discrete functional building blocks, e.g., a phase-locked loop, etc., the functions of any one or more of those building blocks can be carried out using one or more appropriate programmed processors, e.g., a digital signal processor. In addition, although illustrated in the context of a pulsed signal having 6 UDB samples out of 8 samples in each frame, i.e., a 6-out-of-8 scheme, other combinations are possible, e.g., 4 UDB samples out of 5 samples in each frame, 6 UDB samples out of 7 samples in each frame, etc. It should be realized that changing the format of the pulsed signal alters the corresponding tones that are generated. For example, in a 4-out-of-5 scheme or a 6-out-of-7 scheme, the fundamental frequency, $f_0$, would be 8000/10=800 Hz and 8000/14=571.4286 Hz, respectively. In should be noted that in these latter examples, both of these frequencies have an odd multiple at 4000 Hz and cancellation of this frequency component may be difficult. However, channel attenuation at 4000 Hz may be effective to suppress this frequency component.

Finally, although the invention was described in terms of a connection between two user QLS modems, this need not be the case. For example, one endpoint of the data connection may be a data server application that is digital versus analog. This data server application communicates via a digital facility and a network-level QLS modem to the users' QLS-compatible data communications equipment.

What is claimed:

1. A method for use in data communications equipment, the method comprising the steps of:

receiving a first training signal;

generating a first set of tap coefficients that estimate a channel response to the first training signal;

receiving a second training signal;

generating a second set of tap coefficients that estimate a channel response to the second training signal;

receiving a measurement signal representative of a level of an echo signal of at least one of the training signals during a training phase; and in a steady-state phase, transmitting a combined signal that includes a data signal and an analog signal, where the level of the analog signal is the opposite of the level represented by the received measurement signal.

2. The method of claim 1 wherein the first training signal is a timing signal representing a sequence of tones.

3. The method of claim 2 wherein the first training signal represents a sequence of frames, each frame including a number of samples, and wherein the timing signal is transmitted by an periodic alternating signal level in at least one of the number of samples.

4. The method of claim 1 wherein the second training signal represents a sequence of frames, each frame including a number of samples, and wherein the pseudo random data sequence is represented by respective sample levels in each frame.

5. A method for use in data communications equipment, the method comprising the steps of:

transmitting a first training signal to a receiving data communications equipment in a first time interval, where the first training signal is representative of a timing signal;

transmitting a second training signal to the receiving data communications equipment in a time interval different from the first, where the second training signal is representative of a predefined data signal;

measuring an echo signal of the first training signal while transmitting the first training signal; and transmitting the echo measurement to the receiving data communications equipment.

6. The method of claim 5 wherein the timing signal is a sequence of tones.

7. The method of claim 5 wherein the first training signal represents a sequence of frames, each frame including a number of samples, and wherein the timing signal is transmitted by an periodic alternating signal level in at least one of the number of samples.

8. The method of claim 5 wherein the second training signal represents a sequence of frames, each frame including a number of samples, and wherein the predefined data sequence is a pseudo random data sequence represented by respective sample levels in each frame.

* * * * *